US008219569B2

(12) United States Patent
Idicula et al.

(10) Patent No.: US 8,219,569 B2
(45) Date of Patent: Jul. 10, 2012

(54) IN-PLACE EVOLUTION OF XML SCHEMES

(75) Inventors: Sam Idicula, Foster City, CA (US); Sivasankaran Chandrasekar, Palo Alto, CA (US); Nipun Agarwal, Santa Clara, CA (US); Ravi Murthy, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2278 days.

(21) Appl. No.: 10/648,749

(22) Filed: Aug. 25, 2003

(65) Prior Publication Data

US 2005/0050105 A1 Mar. 3, 2005

(51) Int. Cl.
*G06F 7/00* (2006.01)
*G06F 17/30* (2006.01)

(52) U.S. Cl. ............... 707/758; 707/713; 715/513
(58) Field of Classification Search ............ 707/202, 707/1, 100, 3, 10, 203; 715/513
See application file for complete search history.

(56) References Cited

U.S. PATENT DOCUMENTS

| 5,295,261 | A | 3/1994 | Simonetti |
| 5,467,471 | A | 11/1995 | Bader |
| 5,649,200 | A | 7/1997 | Leblang et al. |
| 5,724,577 | A | 3/1998 | Exley et al. |
| 5,734,887 | A | 3/1998 | Kingberg et al. |
| 5,974,407 | A | 10/1999 | Sacks |
| 6,016,497 | A | 1/2000 | Suver |
| 6,571,231 | B2 | 5/2003 | Sedlar |
| 6,604,100 | B1 | 8/2003 | Fernandez et al. |
| 6,636,845 | B2 * | 10/2003 | Chau et al. ............... 707/1 |
| 6,675,230 | B1 | 1/2004 | Lewallen |
| 6,718,322 | B1 | 4/2004 | Brye |
| 6,754,661 | B1 | 6/2004 | Hallin et al. |
| 6,772,180 | B1 | 8/2004 | Li et al. |
| 6,826,568 | B2 | 11/2004 | Bernstein et al. |

(Continued)

FOREIGN PATENT DOCUMENTS

EP 0 856 803 8/1998

(Continued)

OTHER PUBLICATIONS

Ipedo, Inc., "Ipedo XML Database 3.1: Developer's Guide," 2001, XP-002306148, 12 pages.

(Continued)

*Primary Examiner* — Giovanna Colan
(74) *Attorney, Agent, or Firm* — Hickman Palermo Troung Becker Bingham Wong LLP (57) ABSTRACT

A method and system for the in-place evolution of XML schemas is disclosed. To automatically evolve an existing XML schema, a schema evolver receives both an existing XML schema and an XML document as input. The XML document indicates changes to be made to the existing XML schema. Based on the existing XML schema and the XML document, the schema evolver evolves the existing XML schema into a new XML schema that incorporates the changes indicated in the XML document. According to one aspect, the schema evolver generates one or more SQL statements based on the new XML schema. The SQL statements, when executed by a database server, cause the database server to evolve database structures that were based on the formerly existing XML schema so that the database structures conform to the new XML schema. This is accomplished "in place," without copying the data in the database structures.

30 Claims, 3 Drawing Sheets

U.S. PATENT DOCUMENTS

| | | | |
|---|---|---|---|
| 6,915,307 | B1 | 7/2005 | Mattis et al. |
| 6,941,511 | B1 | 9/2005 | Hind et al. |
| 7,031,956 | B1 | 4/2006 | Lee et al. |
| 7,036,072 | B1 | 4/2006 | Sulistio et al. |
| 2002/0007363 | A1* | 1/2002 | Vaitzblit ............... 707/202 |
| 2002/0169788 | A1 | 11/2002 | Lee et al. |
| 2002/0184401 | A1 | 12/2002 | Kadel, Jr. et al. |
| 2003/0004937 | A1 | 1/2003 | Salmenkaita et al. |
| 2003/0120665 | A1* | 6/2003 | Fox et al. ............... 707/100 |
| 2003/0140308 | A1 | 7/2003 | Murthy et al. |
| 2004/0043758 | A1 | 3/2004 | Sorvari et al. |
| 2004/0064466 | A1 | 4/2004 | Manikutty et al. |
| 2004/0176958 | A1 | 9/2004 | Salmenkaita et al. |
| 2004/0225680 | A1 | 11/2004 | Cameron et al. |
| 2004/0268240 | A1 | 12/2004 | Vincent |
| 2005/0050058 | A1 | 3/2005 | Jain et al. |
| 2005/0050092 | A1 | 3/2005 | Jain et al. |
| 2005/0050105 | A1 | 3/2005 | Idicula et al. |

FOREIGN PATENT DOCUMENTS

| | | |
|---|---|---|
| JP | 60-218142 | 10/1985 |
| JP | 2-165353 | 6/1990 |
| JP | 8-249159 | 9/1996 |
| WO | WO 03/030031 | 4/2003 |

OTHER PUBLICATIONS

Chris Parkerson, "Ipedo XML Database 3.1 Now Available," Jul. 22, 2002, XP-002306149, pp. 1-2.

Can Türker, "Schema Evolution in SQL-99 and Commercial (Object-) Relational DDMS," 9$^{th}$ International Workshop on Foundations of Models and Languages for Data and Obejcts Fomlado/Demm 2000, Sep. 18, 2000, XP-002306150, pp. 1-32.

Hong Su et al., "XEM: XML Evolution Management," Jan. 2002, XP-002306151, pp. 1-32.

Yuan Wang et al., "X-Diff: An Effective Change Detection Algorithm for XML Documents," Proceedings of the 19$^{th}$ International Conference on Data Engineering (ICDE'03), 2003, IEEE, pp. 519-530.

Awais Rashid, "A Framework for Customisable Schema Evolution in Object-Oriented Databases," Proceedings of the Seventh International Database Engineering and Applications Symposium (IDEAS'03), 2003, IEEE, 5 pages.

Xue Li, "A Survey of Schema Evolution in Object-Oriented Databases," 1999, IEEE, pp. 362-371.

International Search Authority, "Notification of Transmittal of the International Search Report and the Written Opinion of the International Search Authority, or the Declaration," Dec. 8, 2004, International Application No. PCT/US2004/027464, 14 pages.

"Current Claims of PCT/US2004/027464," pp. 1-7.

Daniele Braga et al., "A Graphical Environment to Query XML Data with Query," Proceedings of the Fourth International Conference on Web Information Systems Engineering (WISE '03), 2003, IEEE, 10 pages.

Shelley Higgins, Oracle Corporation, "Oracle9$i$, XML Database Developer's Guide—Oracle XML DB," Release 2 (9.2), Oct. 2002, Part No. A96620-02, pp. 1-1,044 (text provided on CD-ROM).

Chen, Ruey-Shun et al., "Developing an XML framework for metadata system", Trinity College Dublin, Proc. of the 1$^{st}$ Inter. Sympo. on Information and Communication, pp. 267-272.

Informix, "Universal Data Option for Informix Dynamic Server," Informix Corporation, 1998, 8 pages.

Manolescu, Dragos, Review of "Metadata solutions: using metamodels, repositories, XML, and enterprise portals to generate information on demand by Adrienne Tannebaum", Mar. 2003, ACM Press, vol. 28, Issue 2, p. 38.

Riggs, Roger et al., "Pickling State in the Java™ System," XP002128178, 10 pages.

Japan Patent Office, "Notice of Ground of Rejection," with English translation, application 569332/2000, dated Apr. 27, 2005, 6 pages.

State Intellectual Property Office of P.R.C., "The First Office Action", foreign application No. 200480024233, received Dec. 5, 2007, 13 pages.

Claims, foreign application No. 200480024233, 4 pages.

Oracle, "Oracle IFS (Internet Filing System)", Technical Data Sheet, Mar. 1999, 4 pages.

The State Intellectual Property Office of P.R.C., "Notification of the Second Office Action", Foreign application No. 200480024233.X, received May 14, 2008, 4 pages.

Claims, Foreign application No. 200480024233.X, 3 pages.

\* cited by examiner

IN-PLACE EVOLUTION OF XML SCHEMES

RELATED APPLICATIONS

The present application is related to the following U.S. Patent Applications, the entire contents of which are incorporated herein by reference for all purposes:

U.S. patent application Ser. No. 10/260,138, filed on Sep. 27, 2002, entitles OPERATORS FOR ACCESSING HIERARCHICAL DATA IN A RELATIONAL SYSTEMS, by Nipun Agarwal, Ravi Murthy, Eric Sedlar, Sivasankaran Chandrasekar and Fei Ge;

U.S. patent application Ser. No. 10/260,384, filed on Sep. 27, 2002, entitled PROVIDING A CONSISTENT HIERARCHICAL ABSTRACTION OF RELATIONAL DATA, by Nipun Agarwal, Eric Sedlar, Ravi Murthy and Namit Jain;

U.S. patent application Ser. No. 10/259,278, filed on Sep. 27, 2002, entitled MECHANISM FOR MAPPING XML SCHEMAS TO OBJECT-RELATIONAL DATABASE SYSTEMS, by Ravi Murthy, Muralidhar Krishnaprasad, Sivasankaran Chandrasekar, Eric Sedlar, Vishu Krishnamurthy and Nipun Agarwal;

U.S. patent application Ser. No. 10/260,161, filed on Sep. 27, 2002, entitled INDEXING TO EFFICIENTLY MANAGE VERSIONED DATA IN A DATABASE SYSTEM, by Nipun Agarwal, Eric Sedlar and Ravi Murthy;

U.S. patent application Ser. No. 10/256,524, filed on Sep. 27, 2002, entitled MECHANISMS FOR STORING CONTENT AND PROPERTIES OF HEIRCHICALLY ORGANIZED RESOURCES, by Ravi Murthy, Eric Sedlar, Nipun Agarwal, and Neema Jalali;

U.S. patent application Ser. No. 10/259,176, filed on Sep. 27, 2002, entitled MECHANISM FOR UNIFORM ACCESS CONTROL IN A DATABASE SYSTEM, by Ravi Murthy, Eric Sedlar, Nipun Agarwal, Sam Idicula, and Nicolas Montoya;

U.S. patent application Ser. No. 10/256,777, filed on Sep. 27, 2002, entitled LOADABLE UNITS FOR LAZY MANIFESTATION OF XML DOCUMENTS by Syam Pannala, Eric Sedlar, Bhushan Khaladkar, Ravi Murthy, Sivasankaran Chandrasekar, and Nipun Agarwal;

U.S. patent application Ser. No. 10/260,381, filed on Sep. 27, 2002, entitled MECHANISM TO EFFICIENTLY INDEX STRUCTURED DATA THAT PROVIDES HIERARCHICAL ACCESS IN A RELATIONAL DATABASE SYSTEM, by Neema Jalali, Eric Sedlar, Nipun Agarwal, and Ravi Murthy;

U.S. patent application Ser. No. 10/648,600, filed on the same day herewith, entitled DIRECT LOADING OF SEMI-STRUCTURED DATA, by Namit Jain, Nipun Agarwal, and Ravi Murthy;

U.S. patent application Ser. No. 10/648,577, filed on the same day herewith, entitled DIRECT LOADING OF OPAQUE TYPES, by Namit Jain, Ellen Batbouta, Ravi Murthy, Nipun Agarwal, Paul Reilly, and James Stenoish; and U.S. patent application Ser. No. 10/648,497, filed on the same day herewith, entitled MECHANISM TO ENABLE EVOLVING XML SCHEMA, by Sam Idicula, Nipun Agarwal, Ravi Murthy, Eric Sedlar, and Sivasankaran Chandrasekar.

FIELD OF THE INVENTION

The present invention relates to data management systems, and in particular, to techniques for updating an XML schema, and for updating XML-schema-based instance documents and database structures to conform to an updated XML schema.

BACKGROUND OF THE INVENTION

Using Extensible Markup Language (XML), information may be represented in conformity with a specified hierarchical structure. An XML schema defines such a structure. An XML schema comprises a root XML element. One or more other XML elements may be nested within the root XML element as content of the root XML element. Such nested XML elements are called child XML elements of the root XML element. Conversely, the root XML element is called the parent XML element of the child XML elements. Each child XML element may, in turn, be a parent XML element of one or more additional child XML elements nested within the parent XML element. The parent-child relationships of XML elements within an XML schema define a hierarchical structure according to which information may be stored in a hierarchically structured manner. For each XML element in an XML schema, the XML schema defines the type of that XML element's content value.

Information stored in conformity with an XML schema does not need to indicate the XML tags of the XML elements in the XML schema. Specifically, as long as it is known to which XML schema such information conforms, content values that correspond to XML elements in an XML schema may be stored without the XML tags that would enclose the content values. For example, content values may be stored according to a format in which the content values are separated by delimiters such as comma characters. Reference may be made to the corresponding XML schema in order to align the content values with their corresponding XML elements in the XML schema.

For another example, database structures, such as database tables and database views, may be generated based on an XML schema. The names and data types associated with columns in such database tables may correspond to names and data types indicated by attributes of XML elements in the XML schema. A content value that corresponds to a particular XML element in the XML schema may be stored in a database table's column that corresponds to the particular XML element.

Multiple different sets of content values, each based on the same XML schema, may be stored distinctly from each other. Each set is a separate "instance document." For example, an XML schema may define an XML element such as "<element name='quantity' type='integer'>". One instance document may contain a content value of "1" that corresponds to the XML element. Another instance document may contain a content value of "2" that corresponds to the same XML element. When content values are stored in database tables, content values from different instance documents may be stored in different rows of the database tables. Content values that correspond to the same XML element may be stored in the same column of a database table.

Often, even after many instance documents have been generated in conformity with a particular XML schema, it may be desirable to evolve the XML schema. For example, it may be desirable to add a new XML element to the XML schema, sometimes by inserting the new XML element between existing XML elements in the XML schema. For another example, if a particular XML element represents an enumerated data type, it may be desirable to insert a new XML element into a set of child XML elements of the particular XML element, where each child XML element represents a different enumerated value.

An XML schema may be modified manually using, for example, a text editing tool. Unfortunately, as a consequence of the modification of the XML schema, existing instance documents that formerly conformed to the XML schema might cease to conform to the XML schema. Instance documents interpreted according to the modified XML schema might be interpreted incorrectly, causing content values in the instance documents to be aligned with the wrong XML elements in the modified XML schema.

Additionally, database structures, such as database tables and database views, whose structures were based on the XML schema prior to the modification of the XML schema, might also cease to conform to the XML schema. As a result, it might be impossible to store correctly, in such database structures, content values in instance documents generated in conformity with the modified XML schema. For example, a database table might lack a column that corresponds to a new XML element that was inserted into the XML schema. Furthermore, existing instance documents may be interpreted incorrectly if the mapping of a specific column to a specific XML element has changed.

There is no established approach for ensuring that XML-schema-based instance documents and database structures will continue to conform to the XML schema upon which they are based after the XML schema has been modified. A technique is needed for evolving an XML schema while ensuring that XML-schema-based instance documents and database structures will continue to conform to the XML schema even after the XML schema has been evolved.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and system are provided for in-place evolution of (1) an XML schema, (2) database object types and tables that are based on the XML schema, and (3) database object instances that are based on the database object types. In the following description, for the purposes of explanation, numerous specific details are set forth in order to provide a thorough understanding of the present invention. It will be apparent, however, that the present invention may be practiced without these specific details. In other instances, well-known s structures and devices are shown in block diagram form in order to avoid unnecessarily obscuring the present invention.

Functional Overview

It is desirable that instance documents and database structures that conform to an XML schema evolve with the XML schema so that the instance documents and database structures continue conform to the XML schema after the XML schema has been evolved. According to one embodiment of the present invention, such continued conformity is achieved with a schema evolver that executes in a computer system.

The schema evolver receives both an existing XML schema and an XML document as input. The XML document indicates one or more changes to be made to the existing XML schema. Based on the existing XML schema and the XML document, the schema evolver first generates a new XML schema that incorporates the changes indicated in the XML document.

Additionally, according to one embodiment, the schema evolver generates one or more Structured Query Language (SQL) statements based on the new XML schema. The SQL statements, when executed by a database server, cause the database server to evolve database structures that were based on the formerly existing XML schema so that the database structures conform to the new XML schema. Such database structures may define, for example, database object types and database object instances.

Database Object Types, Database Object Tables, and Database Object Instances

A database object type specifies the structure and attributes of all database object instances that are based on the database object type. For example, an "address" object type might specify a sequence of three primitive "VARCHAR" object types: one to store a person's name, one to store a street identifier, and one to store a city identifier. A database object table is a database table that is based on a database object type. For example, an "address" object table based on the "address" object type would comprise at least three separate columns; one for a person's name, one for a street identifier, and one for a city identifier. When a database object type is altered, database object tables based on that database object type are altered correspondingly.

Based on the "address" object type, multiple different "address" object instances may be created. Each of the "address" object instances conforms to the structure and attributes specified by the "address" object type. Each different "address" object instance may specify a different value for a particular attribute specified by the "address" object. For example, one "address" object instance may specify "Joe Smith" as the value of the name attribute, while another "address" object instance may specify "John Taylor" as the value of the name attribute.

When an XML schema is evolved, XML elements may be added to or deleted from the XML schema. The addition of a new XML element may cause the schema evolver to generate an SQL statement that, when executed by a database server, causes the database server to add a corresponding attribute to a database object type. The SQL statement, when executed by the database server, may also cause the database server to add a corresponding column to a database table that stores database object instances that are based on the database object type.

Similarly, the deletion of an XML element may cause the schema evolver to generate an SQL statement that, when executed by the database server, causes the database server to remove a corresponding attribute from a database object type. The SQL statement, when executed by the database server, may also cause the database server to drop a corresponding column from a database table that stores database object instances that are based on the database object type.

Thus, the SQL statements generated by the schema evolver may cause both database object types and database object instances to be evolved to conform to a new XML schema. Such SQL statements may cause database object types and database object instances to be created, deleted, and/or altered.

In-Place Evolution

Techniques described herein allow for "in-place" evolution of XML schemas, as well as database object types and database object instances that are based on such XML schemas. Through "in-place" evolution, additional copies of information represented in such structures do not need to be made. Instead, the information represented by such structures may be updated without making additional copies of the information. Changes to an existing XML schema may be made automatically by modifying the XML schema according to changes indicated by an XML document. A database server may execute automatically generated SQL statements that cause the database server to alter existing database object types and database object instances to conform to the modified XML schema.

"In-place" evolution differs from "data copy" evolution. "Data copy" evolution involves making a copy of the information represented by the structures to be evolved, then the deleting the structures, then creating new structures, and then inserting the information from the copy back into corresponding components of the new structures. "In-place" evolution typically exhibits performance superior to "data copy" evolution and does not require the disk space that data copy evolution requires.

Interaction Between Structures Involved In In-Place XML Schema Evolution

Figure 1:
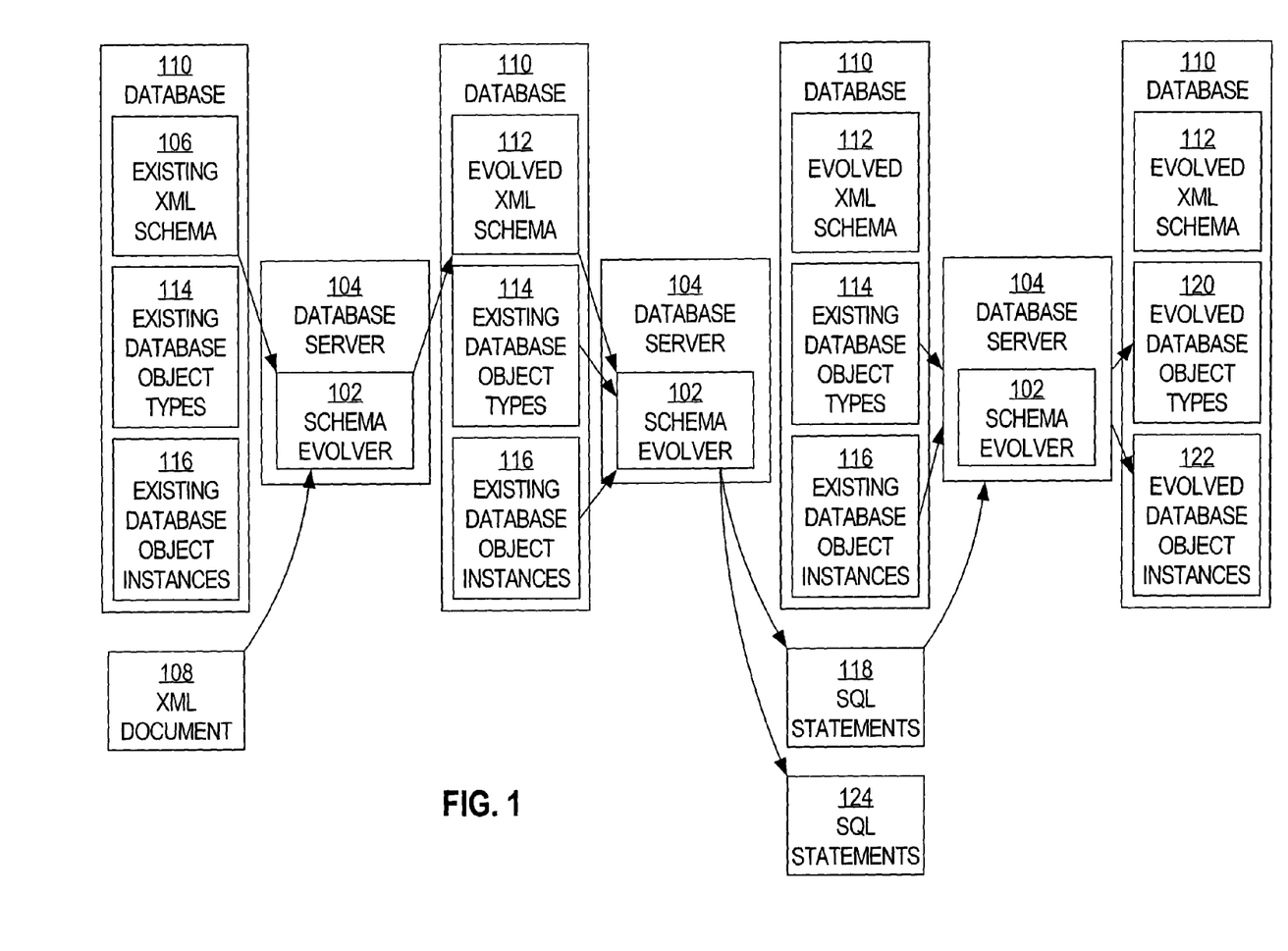
FIG. 1 is a block diagram that illustrates the interaction between structures involved in in-place XML schema evolution, according to an embodiment of the present invention.

FIG. 1 is a block diagram that illustrates the interaction between structures involved in in-place XML schema evolution, according to an embodiment of the present invention. A schema evolver 102 is a component of a database server 104. Database server 104 executes in a computer system. The schema evolver 102 receives, as input, an existing XML schema 106 and an XML document 108. Existing XML schema 106 is an XML schema that is currently registered in database 110. XML document 108 indicates, in XML, changes to be made to existing XML schema 106.

Schema evolver 102 automatically alters existing XML schema 106 so that the changes indicated by XML document 108 are incorporated into existing XML schema 106. As a result, existing XML schema 106 evolves into evolved XML schema 112. Evolved XML schema 112 incorporates all of the changes indicated by XML document 108.

According to one embodiment, schema evolver 102 receives, as input, evolved XML schema 112, existing database object types 114, and existing database object instances 116. Existing database object types 114 conform to the structure indicated by existing XML schema 106. Existing database object instances 116 conform to the type definitions indicated by database object types 114.

Schema evolver 102 determines which aspects of existing database object types 114 do not conform to evolved XML schema 112. Based on these non-conforming aspects, schema evolver 102 automatically generates SQL statements 118 that, when executed by database server 104, cause database server 104 to alter existing database object types 114 to conform to evolved XML schema 112. Additionally, when executed by database server 104, SQL statements 118 also cause the database server to make existing database object instances 116 conform to the changes to existing type definitions 114 that will result from database server 104 executing the SQL statements.

Database server 104 executes SQL statements 118. As a result, database server 104 evolves existing database object types 114 into evolved database object types 120. As another result, database server 104 also evolves existing database object instances 116 into evolved database object instances 122. Evolved database object types 120 conform to the structure indicated by evolved XML schema 112. Evolved database object instances 122 conform to the structures indicated by evolved database object types 120.

Rollback Statements

SQL statements 118 may be called "evolve" statements because, when executed, the SQL statements cause database server 104 to evolve existing database object types 114 and existing database object instances 116. In order to make the evolution an atomic transaction, schema evolver 102 also generates SQL statements 124 that, if executed by database server 104, will cause the database server to undo, or "roll back" all of the effects of SQL statements 118 that have been executed when the error occurs. Therefore, SQL statements 124 may be called "rollback statements."

If, during execution of SQL statements 118, an error occurs, then database server 104 executes those of SQL statements 124 that will reverse the effects of those of SQL statements 118 that the database server has executed. Therefore, unless the entire evolution completes successfully, no part of the evolution is made permanent.

Changes to XML schema 106 are also reversed when an error occurs during XML schema evolution. For example, schema evolver 102 may track changes that schema evolver 102 makes to XML schema 106 and then undo those changes if an error occurs before the entire evolution transaction is complete.

Figure 2:
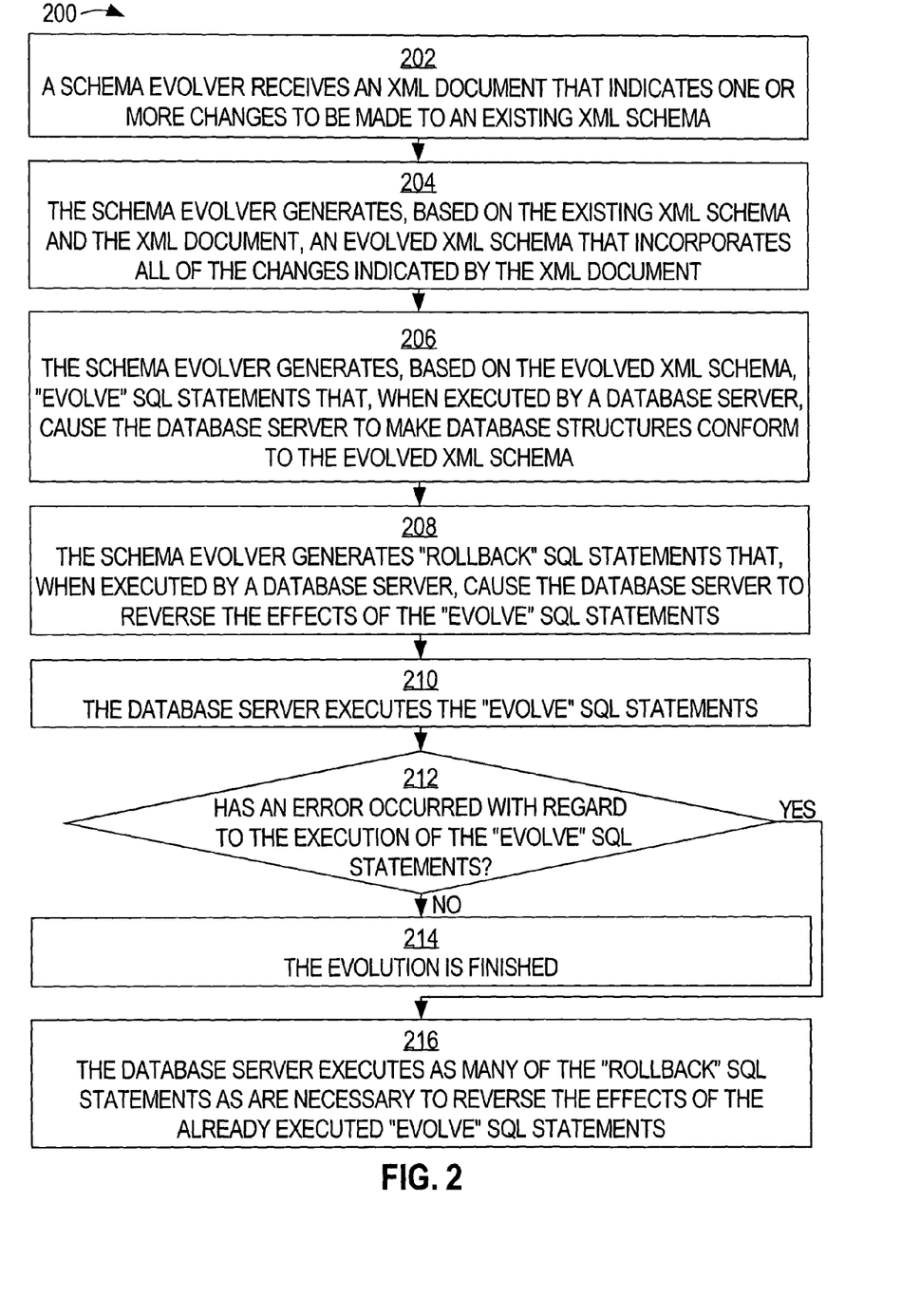
FIG. 2 is a flow diagram that illustrates a technique, according to an embodiment of the present invention, for evolving an XML schema and XML-schema-based database structures in place.

Example Technique for Evolving an XML Schema and XML-Schema-Based Database Structures in Place FIG. 2 is a flow diagram that illustrates a technique 200, according to an embodiment of the present invention, for evolving an XML schema and XML-schema-based database structures in place. In block 202, a schema evolver receives an XML document. The XML document indicates one or more changes to be made to an existing XML schema.

In block 204, the schema evolver generates, based on the existing XML schema and the XML document, an evolved XML schema. The evolved XML schema incorporates all of the changes indicated by the XML document. The schema evolver may track the changes that were made to the existing XML schema in order to produce the evolved XML schema.

In block 206, the schema evolver generates, based on the evolved XML schema, "evolve" SQL statements. The "evolve" SQL statements, when executed by a database server, cause the database server to do one or more of the following: create a new database structure, delete an existing database structure, and/or alter an existing database structure. Database structures that may be created, deleted, and/or altered may include structures that define database object types and structures that define database object instances.

The "evolve" SQL statements, when executed by a database server, cause the database server to make database object types that are based on the pre-evolved XML schema conform to the structure indicated by the evolved XML schema. Thus, the database object types are evolved. Also, when a database server executes the "evolve" SQL statements, the "evolve" SQL statements cause the database server to make database object instances that are based on the pre-evolved database object types conform to the evolved database object types. Thus, the database object instances are evolved.

For example, the schema evolver may generate, based on an evolved XML schema that incorporates a new XML element, an SQL statement that causes a database server to add a new column to a database table. The new column may have the same name as the name indicated by the attributes of the new XML element, and may be populated with default values based on the type indicated by the attributes of the new XML element. SQL statements that the schema evolver may generate may include actions such as "CREATE," "ALTER," "ADD," "MODIFY," and "DROP." Such SQL statements may indicate whether the target of the SQL statement is a "TYPE," a "TABLE," etc.

In block 208, the schema evolver generates one or more "rollback" SQL statements. The schema evolver may generate the "rollback" SQL statements as the schema evolver generates the "evolve" SQL statements. The "rollback" SQL statements, when executed by a database server, cause the database server to reverse the effects of the "evolve" SQL statements on the targets of the "evolve" SQL statements.

In block 210, the database server executes the "evolve" SQL statements. As a result, database object types and database object instances may be created, deleted, or altered. If no error occurs, then the resulting database object types and database object instances conform to the evolved XML schema.

While the database server executes the "evolve" SQL statements, it is determined, in block 212, whether an error has occurred with regard to the execution of the "evolve" SQL statements. If the "evolve" SQL statements execute entirely without an error, then control passes to block 214. Otherwise, control passes to block 216 as soon as the error occurs.

If no error occurs, then, in block 214, the evolution is finished. However, if an error occurs during the execution of the "evolve" SQL statements, then, in block 216, the database server executes as many of the "rollback" SQL statements as are necessary to reverse the effects of the already executed "evolve" SQL statements on the targets of the "evolve" SQL statements. The schema evolver may also undo the changes made to the XML schema based on the changes the schema evolver tracked while evolving the XML schema. As a result, the XML schema and database structures based on the XML schema are rolled back to their pre-evolutionary state. Thus, the evolution is guaranteed to be an atomic operation.

The XDIFF Schema

As described above, a schema evolver may evolve an existing XML schema into an evolved XML schema based on an XML document that indicates changes to be made to the existing XML schema. The XML document may express the changes in terms of XML elements defined by an "xdiff" XML schema of which the XML document is an instance document.

The xdiff schema defines, in XML, primitive elements through which a user may express evolution commands. Such commands may express operations relative to "nodes." As used herein, a "node" is some aspect of an XML structure such as an XML element. For example, one element of the xdiff schema may define the structure of a command to append a specified node to the end of a specified list of nodes. Another element of the xdiff schema may define the structure of a command to insert a specified node immediately before another specified node. Yet another element of the xdiff schema may define the structure of a command to delete a specified node and the child nodes of the specified node.

An exemplary xdiff schema is shown below:

```
<schema targetNamespace="http://xmlns.company.com/xdb/xdiff.xsd"
    xmlns="http://www.w3.org/2001/XMLschema"
    xmlns="http://www.xmlns.company.com/xdb/xdiff.xsd"
    version="1.0" elementFormDefault="qualified">
    <simpleType name="xdiff-nodetype">
        <restriction base="string">
            <enumeration value="element"/>
            <enumeration value="attribute"/>
            <enumeration value="text"/>
            <enumeration value="cdata"/>
            <enumeration value="entity-reference"/>
            <enumeration value="entity"/>
            <enumeration value="processing-instruction"/>
            <enumeration value="notation"/>
        </restriction>
    </simpleType>
    <element name="xdiff">
        <complexType>
            <choice maxOccurs="unbounded">
                <element name="append-node">
                    <complexType>
                        <sequence>
                            <element name="content" type="anyType"/>
                        </sequence>
                        <attribute name="parent-xpath" type="string"/>
                        <attribute name="node-type" type="xd:xdiff-nodetype/>
                    </complexType>
                </element>
                <element name="insert-node-before">
                    <complexType>
                        <sequence>
                            <element name="content" type="anyType"/>
                        </sequence>
                        <attribute name="xpath" type="string"/>
                        <attribute name="node-type" type="xd:xdiff-nodetype/>
                    </complexType>
                </element>
                <element name="delete-node">
                    <complexType>
                        <attribute name="xpath" type="string"/>
                    </complexType>
                </element>
            </choice>
        </complexType>
    </element>
</schema>
```

In the above xdiff schema, three elements are defined: "append-node," "insert-node-before," and "delete-node." The "append-node" element expresses syntax for indicating that the schema evolver should add, as the last child node of the node specified by the "parent-xpath" attribute, the node specified by the "content" element. The node specified by the "content" element is indicated to be of a node type specified by the "node-type" element.

For example, an XML document provided to the schema evolver might contain an element such as:

```
<xd:append-node parent-xpath="/schema/simpleType/restriction" node-
    type="element">
  <xd:content>
    <enumeration value="FL"/>
  </xd:content>
</xd:append-node>
```

Based on this, the schema evolver would add "<enumeration value='FL'/>" to the below XML schema, as shown after the addition:

```
<schema targetNamespace="http://www.company.com/po.xsd">
  <simpleType name="USState">
    <restriction base="string">
      <enumeration value="NY"/>
      <enumeration value="CA"/>
      <enumeration value="FL"/>
    </restriction>
  </simpleType>
</schema>
```

The "insert-node-before" element expresses syntax for indicating that the schema evolver should insert the node specified by the "content" element immediately before the node specified by the "xpath" attribute. Again, the node specified by the "content" element is indicated to be of a node type specified by the "node-type" element.

For example, an XML document provided to the schema evolver might contain an element such as:

```
<xd:insert-node-before xpath="/schema/simpleType" node-type=
    "comment">
  <xd:content>
    <!-- A type representing US States -->
  </xd:content>
</xd:insert-node-before>
```

Based on this, the schema evolver would insert "<!—A type representing US States—>" in the below XML schema, as shown after the insertion:

```
<schema targetNamespace="http://www.company.com/po.xsd">
  <!-- A type representing US States -->
  <simpleType name="USState">
    <restriction base="string">
      <enumeration value="NY"/>
      <enumeration value="CA"/>
    </restriction>
  </simpleType>
</schema>
```

The "delete-node" element expresses syntax for indicating that the schema evolver should delete the node specified by the "xpath" attribute, along with all of the child nodes of that node. In combination with the "append-node" or "insert-node-before" elements, the "delete-node" element may be used to express a modification to an existing node in an XML schema.

Specifying Nodes in XPath

Because different nodes at different levels of a hierarchy may be expressed by identical text at different locations in an XML schema, merely searching for one specified text string in the XML schema and replacing the text string with another specified text string may not result in a correct transformation. Therefore, XML Path Language (XPath) expressions are used, in an XML document, to specify nodes in an XML schema precisely. An XPath expression identifies a node relative to its location in a hierarchy.

For example, an XML hierarchy might indicate the following nodes:

```
<foo1 xmlns:nmsp1="company">
  <nmsp1:foo1>2</nmsp1:foo1>
  <foo1><foo2>23</foo2></foo1>
</foo1>
```

The XPath expression "/foo1/nmsp1:foo1" precisely identifies the element that contains the content value "2."

Hardware Overview

Figure 3:
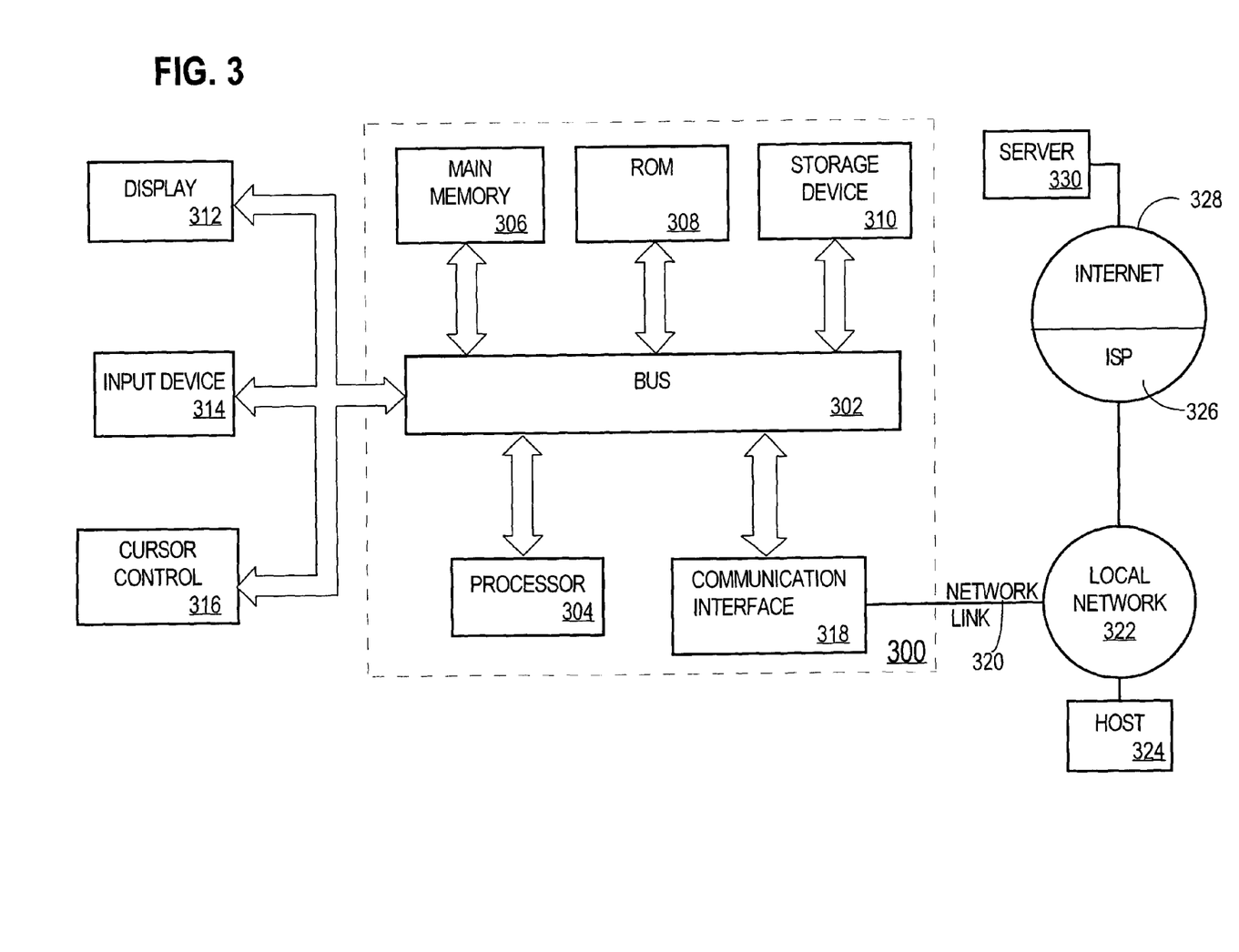
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of evolving an Extensible Markup Language (XML) Schema, the method comprising:
   receiving, at a schema evolver that is executing in a computer system, a document that indicates one or more changes to be made to a first XML schema;
   based on said first XML schema and said document, said schema evolver generating a second XML schema; and
   based on said second XML schema, generating one or more first Structured Query Language (SQL) statements.

2. The method of claim 1, wherein said first SQL statements, when executed, cause one or more database object types to be created.

3. The method of claim 1, wherein said first SQL statements, when executed, cause one or more database object tables to be created.

4. The method of claim 1, wherein said first SQL statements, when executed, cause one or more database object types to be deleted.

5. The method of claim 1, wherein said first SQL statements, when executed, cause one or more database object tables to be deleted.

6. The method of claim 1, wherein said first SQL statements, when executed, cause one or more database object types to be altered.

7. The method of claim 1, wherein said first SQL statements, when executed, cause one or more database object tables to be altered.

8. The method of claim 1, wherein said first SQL statements, when executed, cause one or more database object instances to be altered.

9. The method of claim 1, wherein said one or more changes are expressed as one or more instances of one or more XML types specified by a third XML schema.

10. The method of claim 1, further comprising:
    generating one or more second SQL statements that, when executed, cause effects of said one or more first SQL statements to be reversed.

11. The method of claim 10, further comprising:
    determining, while executing said one or more first SQL statements, whether an error has occurred; and in response to determining that an error has occurred, executing one or more of said one or more second SQL statements that, when executed, cause effects of said one or more first SQL statements that have been executed to be reversed.

12. A method of generating Structured Query Language (SQL) statements to alter database types in a database system that has definition data that defines a set of one or more database object types, the method comprising:

receiving a first Extensible Markup Language (XML) schema; and based on said first XML schema, generating one or more SQL statements that, when executed, cause a database server to alter said set of one or more database object types;

wherein said one or more database object types were generated based on a second XML schema that differs from said first XML schema.

13. The method of claim 12, wherein said first XML schema was generated based on said second XML schema.

14. The method of claim 12, wherein said one or more SQL statements, when executed, cause said database server to create one or more of said one or more database object types.

15. The method of claim 12, wherein said one or more SQL statements, when executed, cause said database server to delete one or more of said one or more database object types.

16. A volatile or non-volatile computer-readable storage medium carrying one or more sequences of instructions which, when executed by one or more processors, causes the one or more processors to perform the method recited in claim 1.

17. A volatile or non-volatile computer-readable storage medium carrying one or more sequences of instructions which, when executed by one or more processors, causes the one or more processors to perform the method recited in claim 2.

18. A volatile or non-volatile computer-readable storage medium carrying one or more sequences of instructions which, when executed by one or more processors, causes the one or more processors to perform the method recited in claim 3.

19. A volatile or non-volatile computer-readable storage medium carrying one or more sequences of instructions which, when executed by one or more processors, causes the one or more processors to perform the method recited in claim 4.

20. A volatile or non-volatile computer-readable storage medium carrying one or more sequences of instructions which, when executed by one or more processors, causes the one or more processors to perform the method recited in claim 5.

21. A volatile or non-volatile computer-readable storage medium carrying one or more sequences of instructions which, when executed by one or more processors, causes the one or more processors to perform the method recited in claim 6.

22. A volatile or non-volatile computer-readable storage medium carrying one or more sequences of instructions which, when executed by one or more processors, causes the one or more processors to perform the method recited in claim 7.

23. A volatile or non-volatile computer-readable storage medium carrying one or more sequences of instructions which, when executed by one or more processors, causes the one or more processors to perform the method recited in claim 8.

24. A volatile or non-volatile computer-readable storage medium carrying one or more sequences of instructions which, when executed by one or more processors, causes the one or more processors to perform the method recited in claim 9.

25. A volatile or non-volatile computer-readable storage medium carrying one or more sequences of instructions which, when executed by one or more processors, causes the one or more processors to perform the method recited in claim 10.

26. A volatile or non-volatile computer-readable storage medium carrying one or more sequences of instructions which, when executed by one or more processors, causes the one or more processors to perform the method recited in claim 11.

27. A volatile or non-volatile computer-readable storage medium carrying one or more sequences of instructions which, when executed by one or more processors, causes the one or more processors to perform the method recited in claim 12.

28. A volatile or non-volatile computer-readable storage medium carrying one or more sequences of instructions which, when executed by one or more processors, causes the one or more processors to perform the method recited in claim 13.

29. A volatile or non-volatile computer-readable storage medium carrying one or more sequences of instructions which, when executed by one or more processors, causes the one or more processors to perform the method recited in claim 14.

30. A volatile or non-volatile computer-readable storage medium carrying one or more sequences of instructions which, when executed by one or more processors, causes the one or more processors to perform the method recited in claim 15.

* * * * *

UNITED STATES PATENT AND TRADEMARK OFFICE
CERTIFICATE OF CORRECTION

PATENT NO. : 8,219,569 B2
APPLICATION NO. : 10/648749
DATED : July 10, 2012
INVENTOR(S) : Idicula et al.

Page 1 of 1

It is certified that error appears in the above-identified patent and that said Letters Patent is hereby corrected as shown below:

On the title page, item (54) and in column 1, line 1, under "Title", delete "SCHEMES" and insert -- SCHEMAS --, therefor.

On the title page, in column 2, under "Attorney, Agent, or Firm", line 1, delete "Troung" and insert -- Truong --, therefor.

On page 2, in column 1, under "Other Publications", line 4, delete "DDMS," and insert -- DBMS, --, therefor.

On page 2, in column 1, under "Other Publications", line 5, delete "Obejcts" and insert -- Objects --, therefor.

In column 1, line 9, delete "entitles" and insert -- entitled --, therefor.

In column 1, line 10, delete "SYSTEMS," and insert -- SYSTEM, --, therefor.

In column 1, line 31, delete "HEIRARCHICALLY" and insert -- HIERARCHICALLY --, therefor.

In column 4, line 1, after "known" delete "s".

Signed and Sealed this
Second Day of October, 2012

David J. Kappos
*Director of the United States Patent and Trademark Office*